No. 695,125. Patented Mar. 11, 1902.
H. SUE.
APPARATUS FOR CHARGING LIQUIDS WITH CARBONIC ACID GAS.
(Application filed Nov. 10, 1900.)
(No Model.) 2 Sheets—Sheet 1.
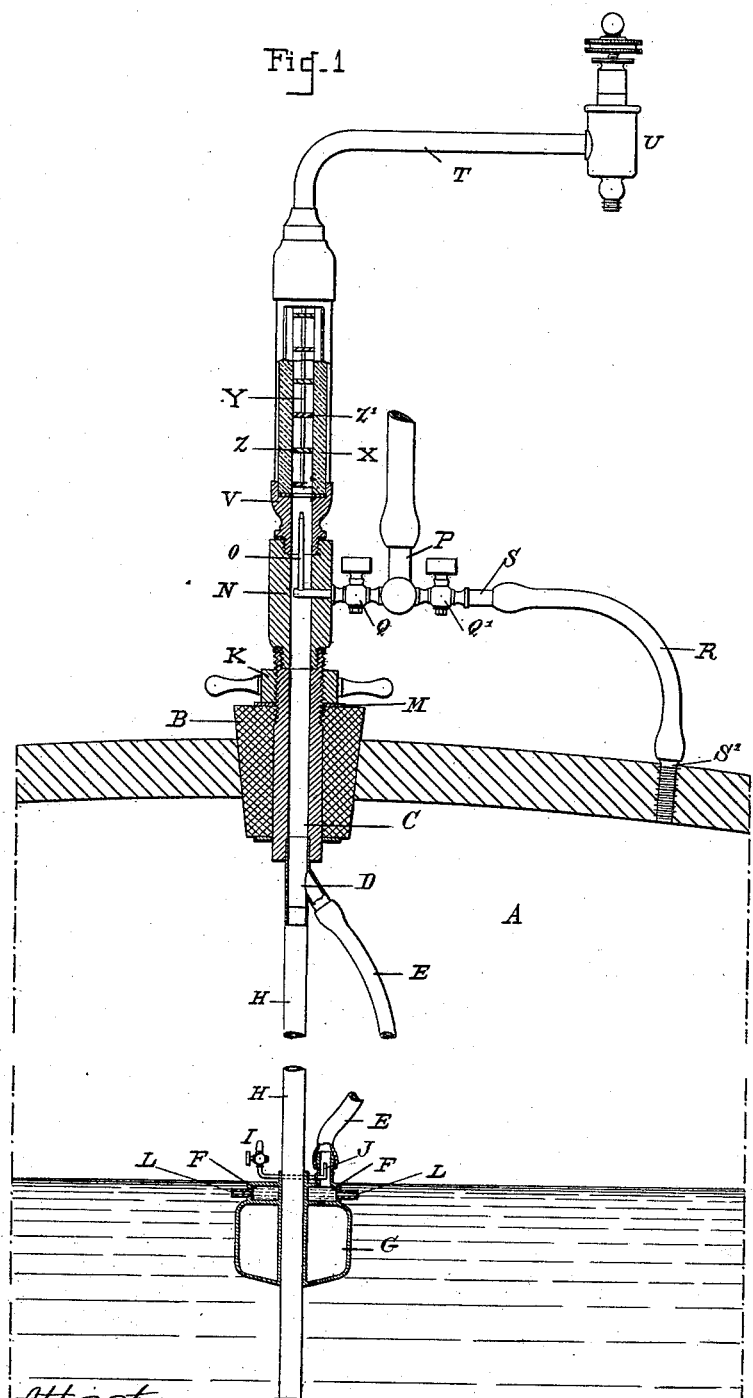
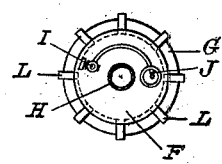

No. 695,125. Patented Mar. 11, 1902.
H. SUE.
APPARATUS FOR CHARGING LIQUIDS WITH CARBONIC ACID GAS.
(Application filed Nov. 10, 1900.)
(No Model.) 2 Sheets—Sheet 2.
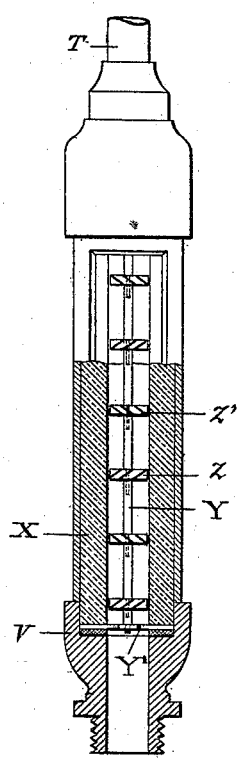
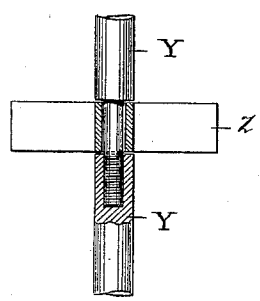
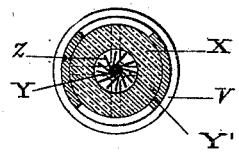
WITNESSES:
INVENTOR
ATTORNEYS.

UNITED STATES PATENT OFFICE.

HENRY SUE, OF PARIS, FRANCE.

APPARATUS FOR CHARGING LIQUIDS WITH CARBONIC-ACID GAS.

SPECIFICATION forming part of Letters Patent No. 695,125, dated March 11, 1902.

Application filed November 10, 1900. Serial No. 36,117. (No model.)

*To all whom it may concern:*

Be it known that I, HENRY SUE, a citizen of the Repulic of France, and a resident of Paris, France, have invented certain new and useful Improvements in Apparatus for Charging Liquids with Carbonic-Acid Gas, of which the following is a specification.

This apparatus is designed to mix carbonic-acid gas under pressure with any liquids, but more especially with wines, supersaturating them, and it can be applied to an opening into any vessel—to a bung-hole, for instance. The gas issuing under moderate pressure, an atmosphere or an atmosphere and a half can continuously produce liquid suitably saturated with carbonic acid, so as to be served in effervescing condition, the foam being abundant and, moreover, persistent, like that of champagne, when the liquid treated is wine. This result could never be attained even with troublesome operations, the foam hitherto produced with unfermented liquids being always fugitive.

The apparatus to which this invention relates effects an intimate supersaturated mixture of carbonic acid with the liquid by producing subdivided currents of the gas and the liquid, which become intimately mingled by the agency of the reactions produced by suitable resistances, as will be explained in the specification and claimed at its conclusion.

In order to render the description more easily understood, I shall refer to the annexed drawings, which show, by way of example—

Figure 1, a vertical section of an aerating apparatus according to my invention; Fig. 2, a sectional plan. Fig. 3 represents a detailed view of that part of the apparatus shown in Fig. 1 in which are placed the parts Z Z'. Fig. 4 represents a cross-section of the same, and in Fig. 5 is shown a detailed view of the fitting up.

Like letters of reference denote corresponding parts in all the figures.

A is the cask holding the liquid to be aerated. Through the bung-hole, hermetically closed by a caoutchouc bung B or other tight closure, there is introduced into the cask a tube C, having at its lower end a nozzle D, which by means of a flexible tube E communicates with a hollow ring F, supported by a suitably-regulated float G, which slides upon a rod H, connected to the tube C. From the ring F radiate a number of small tubes L, by which enters the liquid, which by the action of the gas-pressure, as will hereinafter be explained, ascends by the flexible tube E to the tube C. The float has also a small adjustable passage I, communicating by a tube J with the flexible tube and serving to inject carbonic acid into the liquid in the flexible tube. On the tube C is screwed outside a fly-nut K, which by pressure on a washer M swells the bung B, thus insuring the necessary tightness, and to the tube is connected a passage N, into which through a tube O can be injected carbonic acid, supplied through a nozzle P and regulated by a cock Q. The same nozzle P serves for delivery of gas into the cask A by a flexible pipe R, having its one end attached at S and regulated by the cock Q', which is integral with P, and its other end attached to a nozzle S', projecting from the cask A, to which it is tightly fixed by screwing or otherwise.

On the passage N is tightly screwed the metallic holder V of a glass tube X, in which are placed on a central rod Y fixed or movable washers Z Z', provided with helical blades alternately inclined in opposite directions. The apparatus terminates at the top in a laterally-bent tube T, having at its end a regulating cock or valve. These washers Z Z' may be fitted up in two different manners, according to whether they are stationary or movable. If they are stationary—that is to say, if they do not turn—then the design represented in Fig. 1 will suffice for explanation. In that case these parts form actually the whole body with their support Y, and they are introduced together with little trouble into the tube X. The parts Z Z' rub against the tube when they enter into it, which is sufficient to maintain the system in position, as these parts Z Z' are fixed, while the liquid alone has to travel over a zigzag route on account of the spiral plates Z Z'. If, on the contrary, the parts Z Z' are movable on their support Y, then it is necessary to make use of the arrangement as represented in Fig. 3. In that case the shaft Y alone is fixed and carried upon an arm Y' placed, for instance, above the disk, which serves to form the joint between the tube X and its support Y. In order to allow the parts Z Z' to turn while maintaining them at the same time upon axis-support Y, it will suffice to form this axis by means of several elements, which fit one into the other, as represented in Fig. 6, each element admitting one part of a smaller diameter, forming the rotation-axis and becoming fixed to the element which is immediately below by means of screwing or in some other manner, it being well understood that this mode of fitting up has been shown here only for example, as some entirely different manner of fitting up might be adopted.

The apparatus operates as follows: By opening the cock Q' carbonic acid at a pressure of from one to one and one-half atmospheres is sent into the cask by the pipe R and nozzle S'. Part of this gas becomes dissolved in the liquid, chiefly in its upper layers, in which is the float G, so adjusted that the tubes L are just immersed in these upper layers of liquid. The gas-pressure also causes liquid to ascend from the ring F into the tube E, while an injection of gas for supersaturating the liquid takes place into the tube E by the tube J, as regulated by the nozzle I. The liquid ascends by the tube E to the tubes C and N, and in the latter it receives for enhancing its saturation and promoting its flow a second injection of gas by the tube O and cock Q, and the mixture under pressure is forced into the tube X, where it meets the helically-bladed washers Z Z', which, owing to their alternate inclinations, produce a churning of the liquid by reason of its being forced to bend successively in different directions a great many times. The motion and churning are increased when the washers Z Z' can revolve. The liquid flows out by the tube T and cock or valve U.

Having thus described the nature of this invention and the best means I know for carrying the same into practical effect, I claim—

1. An apparatus for charging wine and like liquids with gas comprising a suitable receptacle for the liquid, means for supplying gas thereto, a delivery-tube having a plurality of movable disks provided with oppositely-inclined projections and a floating hollow member having openings beneath the surface of the liquid and having a connection to said delivery-tube, substantially as described.

2. In combination with a cask or like receptacle, a delivery-tube, a rod forming a continuation of said delivery-tube, an annular float encircling said rod, a hollow member carried by said float, openings from said hollow member beneath the level of the liquid, a flexible pipe leading from said hollow member to the delivery-tube and a gas-pipe communicating with said flexible pipe, substantially as described.

3. In combination with a cask or like receptacle, a delivery-tube, a rod forming a continuation of said delivery-tube, an annular float encircling said rod, a hollow member carried by said float, openings from said hollow member beneath the level of the liquid, a flexible pipe leading from said hollow member and a gas-pipe extending from the interior of said cask to the delivery-pipe, substantially as described.

In testimony that I claim the foregoing as my invention I have signed my name in presence of two subscribing witnesses.

HENRY SUE.

Witnesses:
EDWARD P. MACLEAN,
JULES FAYOLLET.